June 30, 1970    W. C. PAYNE    3,518,336
METHOD OF FORMING A COMPACT ARTICLE OF PARTICULATE MATERIAL
Filed Oct. 1, 1968    6 Sheets-Sheet 1

June 30, 1970  W. C. PAYNE  3,518,336

METHOD OF FORMING A COMPACT ARTICLE OF PARTICULATE MATERIAL

Filed Oct. 1, 1968  6 Sheets-Sheet 4

United States Patent Office 3,518,336
Patented June 30, 1970

3,518,336
METHOD OF FORMING A COMPACT ARTICLE
OF PARTICULATE MATERIAL
William Charles Payne, East Molesey, England, assignor to Engelhard Industries Limited, Sutton, Surrey, England, a British company
Filed Oct. 1, 1968, Ser. No. 764,152
Claims priority, application Great Britain, Oct. 4, 1967, 45,298/67
Int. Cl. B22f 3/04
U.S. Cl. 264—111                                   7 Claims

ABSTRACT OF THE DISCLOSURE

A method of compaction of a particulate material into a work-piece especially applicable to the production of a work-piece which has relatively thin sections and which is, therefore, comparatively weak until the usual post-compaction heat treatment operation has been carried out, and to a method of compaction of a particulate material which is difficult to compact and which, despite the use of high compacting pressures, often results in a green compact of low strength.

---

The term "green compact" is one well known to those skilled in the art and is used herein to describe a compacted aggregate of particles before any heat treatment operation has been carried out thereon. Such a heat treatment operation is normally known as a sintering or firing operation.

For many years, particulate materials have been compacted by pressing the same in steel dies at pressures varying from only a few pounds per square inch to many tons per square inch. However, except for work-pieces of relatively simple shape, this method of compaction is not particularly satisfactory, since powdered particulate materials do not behave as true fluids and therefore pressure transmission there-through is not uniform. Under favourable conditions, this lack of uniform pressure transmission results in only minor variations in density within the green compact and the uneven shrinkage during sintering caused by these minor variations results in comparatively unimportant distortions. However, attempts to compact irregular shapes of thin section by this known method are much less satisfactory. In many cases compacts having significant variations in density are produced resulting in severely distorted sintered components, whilst in extreme cases no coherent green compact can be produced.

Conventional isostatic compaction, in which the pressure is transmitted by means of a fluid to particulate material contained in a thin flexible membrane, gives strong compacts of uniform density, but is only applicable to the production of work-pieces having very simple shapes, such as rods and bars.

A method of isostatic compacting in which a mould, which may have a complex shape, is made from a reversible gel, is described in detail by T. W. Penrice in "Powder Metallurgy," 1958, No. ½, pages 79 to 84. At high pressures, a reversible gel behaves as a true fluid and hence can function as both the mould and the pressure transmitting fluid. The method is very satisfactory in the majority of cases but, when compacting work-pieces having thin sections using particulate material which is relatively difficult to compact, it is less satisfactory. FIGS. 1, 2 and 3 of the accompanying drawings illustrate the prior art difficulties which are encountered under such conditions. FIG. 1 shows a vertical cross-section of a thin perforated metal cylinder 1 and a mould 2 formed of a reversible gel of the type referred to by T. W. Penrice in the abovementioned article. A crucible-shaped cavity in the mould 2 is filled with a powder 3, which requires a high compacting pressure, such as ruthenium metal powder. The assembly shown in FIG. 1 is placed inside a sealed high-pressure container and the pressure therein is then raised to approximately 25 tons/in.$^2$ by the admission of water at this pressure. The effect is illustrated in FIG. 2, which shows how the volume of both the powder 3 and the reversible gel 2 decreases, but with retention of the relative shapes of the two materials. FIG. 3 illustrates the result obtained when the pressure is allowed to fall slowly to atmospheric pressure. The reversible gel 2 behaves elastically and tends to return to its original volume. However, when high pressures in the order of 25 tons/in.$^2$ have been used for compaction the reversible gel adheres strongly to the powder 3 which has been compacted and the considerable movement of the gel during restoration firstly causes distortion of the compact and ultimately causes fracture thereof, as illustrated.

The behaviour described above with reference to FIGS. 1, 2 and 3 of the accompanying drawings is shown by many powders which are difficult to compact, such as, for example, ruthenium, iridium, tungsten and molybdenum metal powders. Ductile, easily compacted metal powders, such as copper, nickel and iron powders, do not however show this type of behaviour, since properly compacted green compacts of these powders have comparatively high strength.

It is an object of the present invention to overcome or at least mitigate the aforementioned difficulties, and in particular to provide a method whereby green compacts of reasonable strength can be prepared by isostatic compacting from powders which are difficult to compact.

Accordingly the present invention provides a method of producing a workpiece from a particulate material, including the step of isostatically compacting a first particulate material by (a) surrounding said first particulate material to be compacted with a reversible gel and locating a guard ring in the reversible gel between said first particulate material to be compacted and the main body of the reversible gel, the guard ring comprising a second particulate material capable of being compacted to form a green compact capable of withstanding the stresses to be exerted thereon by the reversible gel on release of the compacting pressure, (b) applying a compacting pressure to the reversible gel to compact the particulate materials, (c) releasing the compacting pressure and thereafter (d) recovering the compacted first particulate material from the gel, whereby an isostatically compacted substantially undistorted green compact of said first particulate material is produced.

For a better understanding of the invention and to show the same may be carried into effect, reference will now be made, by way of example, to FIGS. 4 to 16 of the accompanying drawings, in which.

Figure 1:
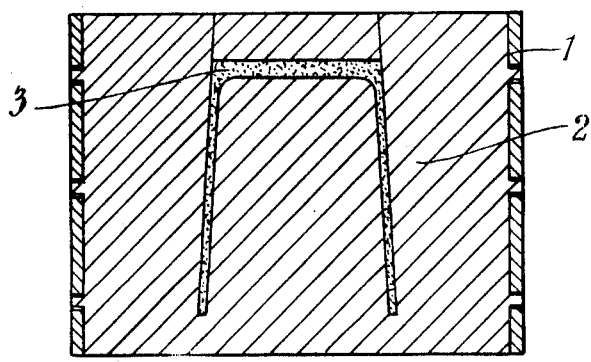
Figure 2:
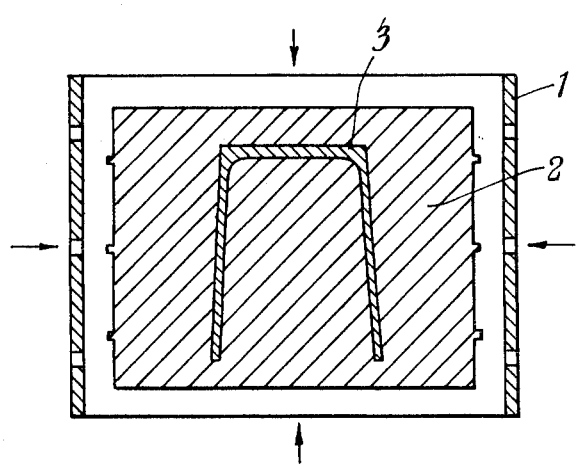
Figure 3:
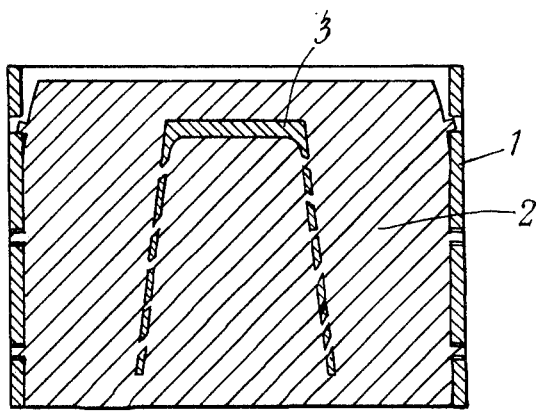
Figure 4:
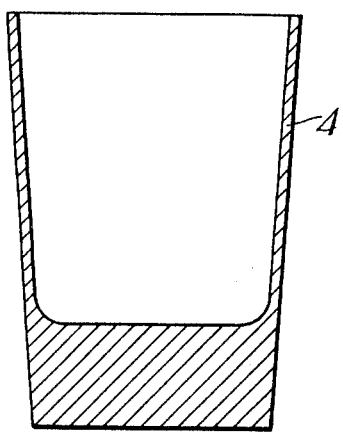
FIG. 4 shows a vertical cross-section of a former.
Figure 5:
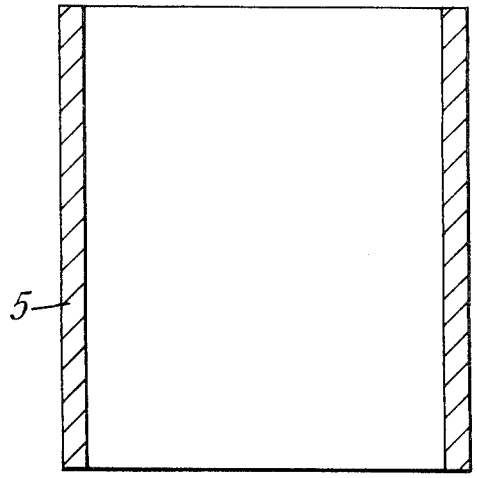
FIG. 5 shows a vertical cross-section of a guard ring.
Figure 6:
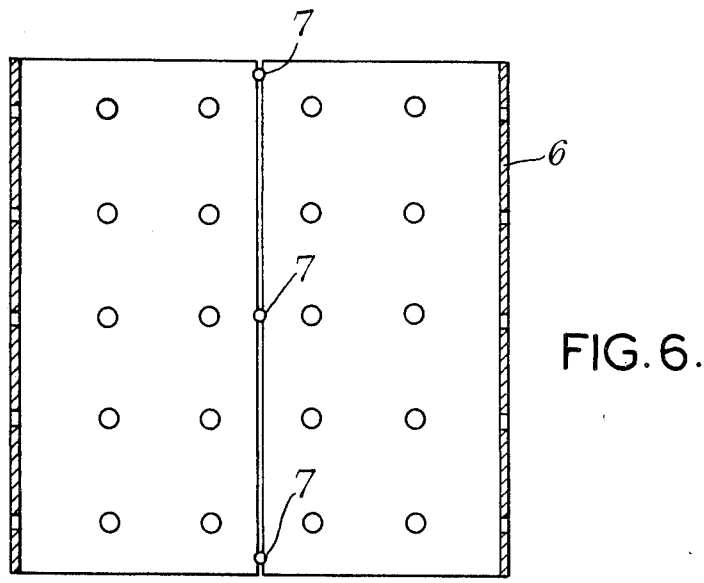
FIG. 6 shows a vertical cross-section of a perforated cylinder.
Figure 7:
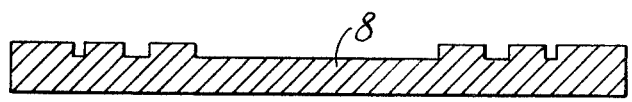
FIG. 7 shows a vertical cross-section of a base plate.
Figure 8:
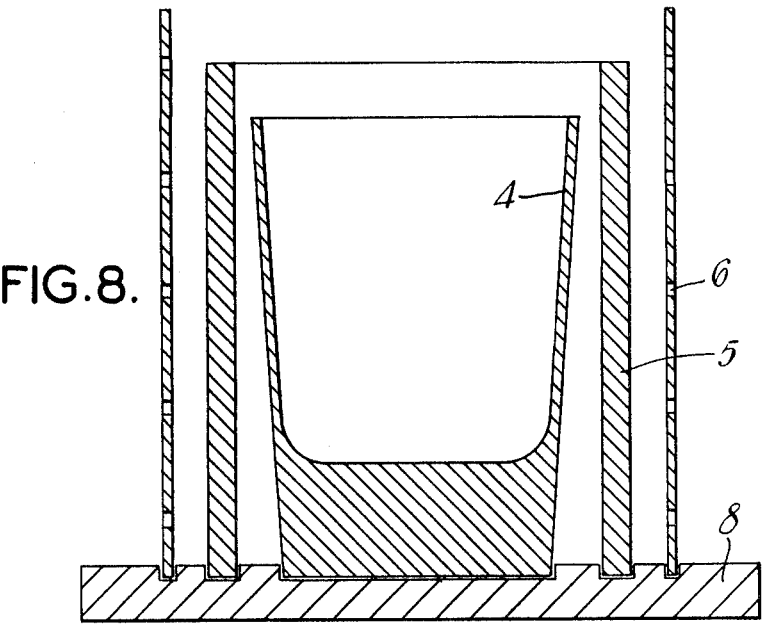
Figure 9:
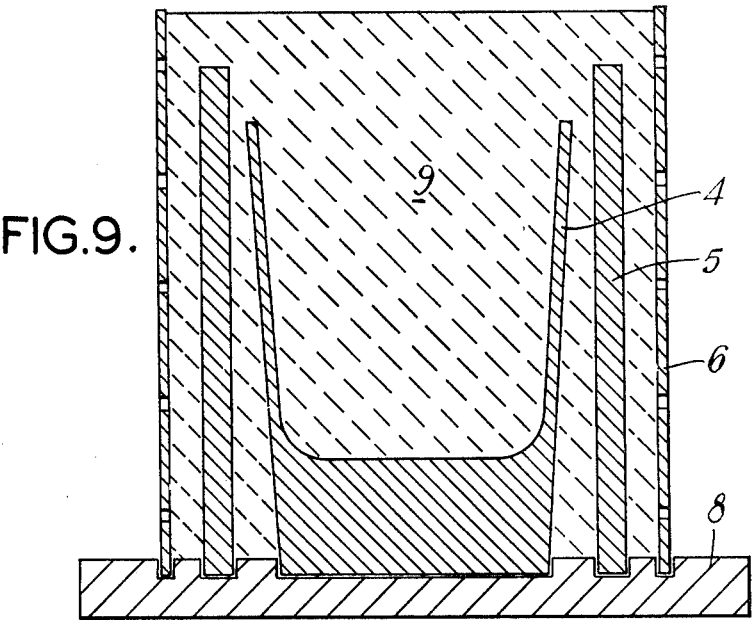
Figure 10:
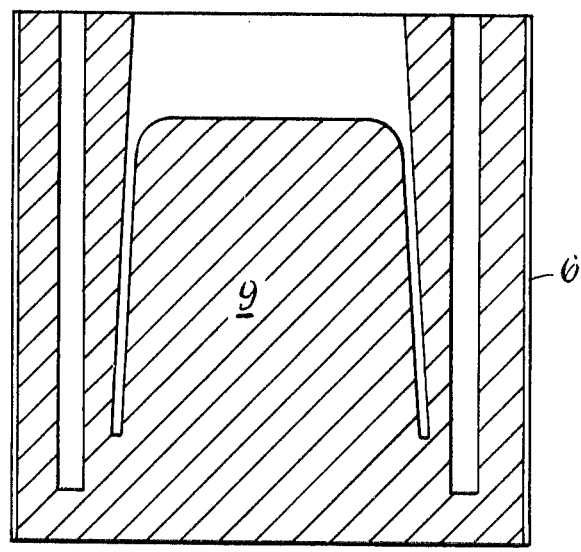
Figure 11:
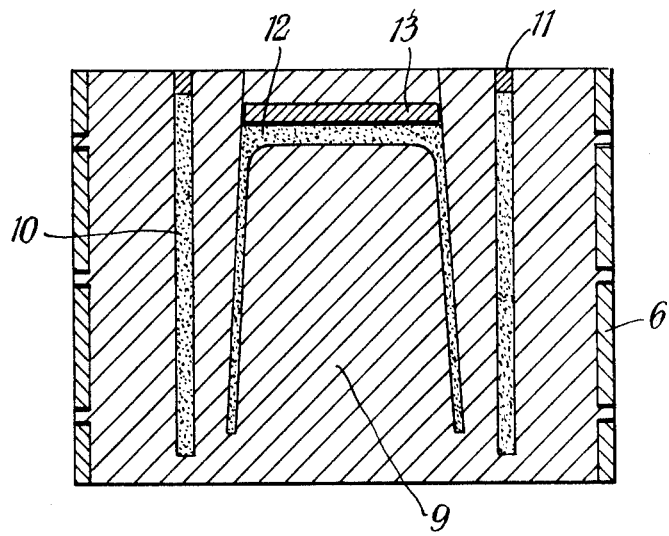
Figure 12:
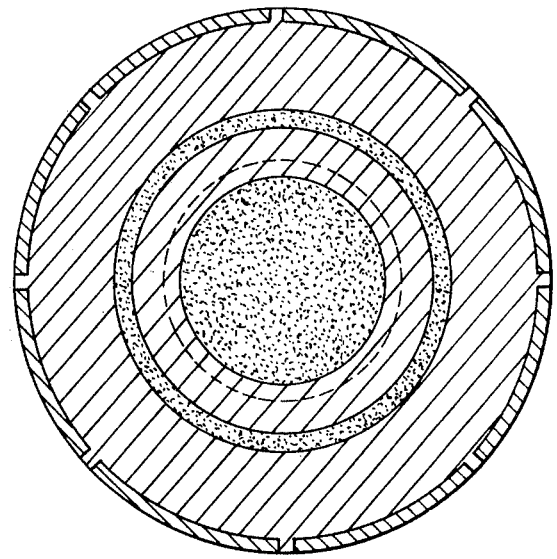
Figure 13:
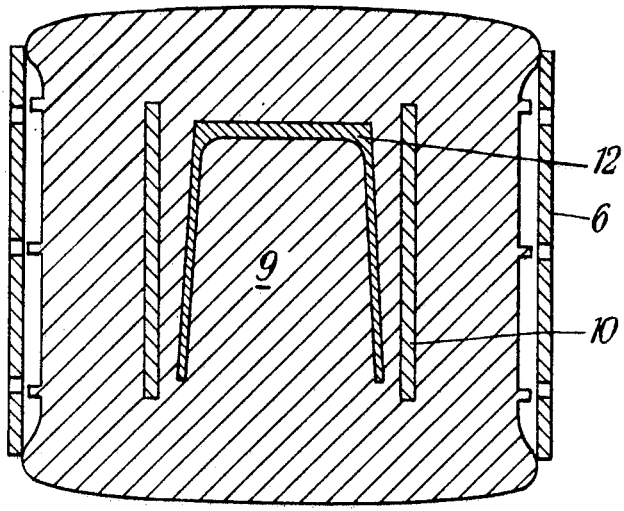
Figure 14:
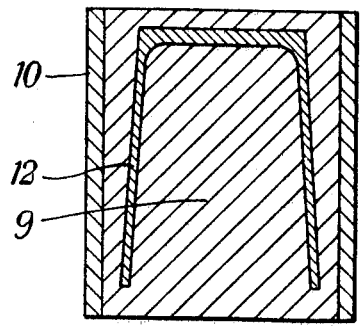
Figure 15:
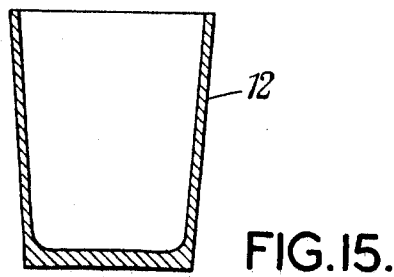
Figure 16:
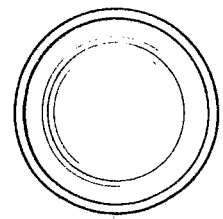

FIG. 8 shows a vertical cross-section of the components of FIGS. 4 to 7 assembled together, FIG. 9 shows a vertical cross-section of the assembly shown in FIG. 8 filled with a reversible gel, FIG. 10 shows a vertical cross-section of a reversible gel mould, FIGS. 11 and 12 respectively show vertical and horizontal cross-sections of the filled mould of FIG. 10 prior to compaction, FIG. 13 shows a vertical cross-section of the filled mould of FIG. 10 after compaction, FIG. 14 shows a vertical cross-section of the compact and guard ring, and FIGS. 15 and 16 respectively show a vertical cross-section and plan view of a green compact ready for sintering.

Referring now to FIGS. 4 to 16 of the drawings, a mild steel former 4 in the shape of a crucible having a base of thickness greater than that required in the final product, a mild steel cylinder 5 which will form a guard ring and a thin perforated brass cylinder 6, formed from two semi-cylinders joined together by means of local spots of soft solder 7, are fitted together in a circular mild steel base plate 8 having annular rings cut in one face to accommodate the same (see FIG. 8). A reversible gel, such as that known as "Vinamold," is then heated in a suitable container to a temperature of approximately 170° C., at which temperature the same becomes liquid. The liquid gel is then poured into the assembled components to completely fill the whole assembly as shown in FIG. 9. The filled assembly is then allowed to cool to room temperature, when the reversible gel assumes its normal dimensionally stable gel properties and rubbery consistency. The base plate 8, the guard ring former 5 and the mild steel crucible-shaped former 4 are then removed from the gel and the remaining reversible gel mould 9 and the perforated cylinder 6 are inverted (see FIG. 10).

Referring now to FIGS. 11 and 12, the guard ring annulus formed by the mild steel cylinder 5 is filled with a metal powder which is readily compacted, for example iron, nickel or copper powder. An annular ring 11 of reversible gel is then sealed into the top of the mould, to seal the powder into the guard ring annulus. The powder 12 from which the desired crucible is to be made is then introduced into the cavity of the mould formed by the removal of the steel former and sealed therein with a plug 13 of reversible gel. The completed assembly is then placed in a high pressure cylinder and subjected to a pressure of 25 tons/in.$^2$ by slowly introducing water. After a suitable length of time the pressure is slowly reduced to atmospheric pressure and then the assembly is removed from the high pressure cylinder.

It will be seen from FIG. 13 that the guard ring 10 formed of readily compacted material is strong enough to prevent the reversible gel expanding to fill the outer perforated container 6. However, the reversible gel expands longitudinally to some extent as shown. The mould 9, the guard ring 10 and the compacted crucible 12 are easily removed from the outer perforated cylinder 6 by melting the soft solder spots 7 and splitting the cylinder 6 into two halves. The superfluous reversible gel is then cut away from around the compacted crucible 12 and the guard ring 10. The compacted crucible 12 is removed from the guard ring 10 and the intermediate gel by slowly raising the temperature thereof to approximately 170° C., at which temperature the reversible gel melts and runs off the green compact crucible, leaving the green compact crucible ready for sintering. Alternatively a mould release agent could be added to the gel, so that the gel could be simply cut away from the green compact crucible 12.

Exemplary of the metals from which articles may be made by the method of the invention are ruthenium, rhodium, iridium and other platinum group metals and alloys thereof, as well as refractory metals such as tungsten and molybdenum and alloys thereof. In addition, other particulate materials, such as refractory metal oxides and other ceramic materials, may be processed by the method of the present invention.

Although the green compact prepared above was in the shape of a crucible, many other shapes, particularly those having thin sections in relation to their other dimensions, such as tubes, nozzles and capsules, may be made by the method of the present invention.

It will be appreciated that it is not necessary for the guard ring to be in a form of a cylinder. For very complex shapes it is frequently desirable for the guard ring to have a form approximating to that of the desired green compact.

The following example further illustrates the present invention.

EXAMPLE

A mild steel crucible former having an overall height of 4.0 inches, an external diameter at the top of 2.98 inches and an external diameter at the bottom of 2.50 inches, a wall thickness of 0.09 inch and a base thickness of 1.0 inch was prepared. A mild steel cylinder having an overall height of 4.5 inches, an external diameter of 4.0 inches and wall thickness of 0.25 inch was also prepared. In addition, a brass cylinder was prepared, having a height of 5.0 inches and an external diameter of 4.85 inches, in two halves from perforated brass sheet 0.06 inch thick. The two halves were joined together to form a cylinder by means of soft solder. The three components were then assemblied on a base plate as shown in FIG. 8 of the accompanying drawings and filled with the commercially available reversible gel sold under the trade name "Vinamold," this being a highly plasticised and gelled polyvinyl chloride manufactured in the United Kingdom by Vinatex Limited. The mild steel former, the mild steel cylinder and the base plate were removed after the mould had been allowed to cool to room temperature and the mould was then inverted as shown in FIG. 10 of the accompanying drawings. The guard ring cavity formed by the removal of the mild steel cylinder was then filled with pure nickel powder (—100 BS mesh), after a brief vibration thereof, not sufficient to cause classification, and sealed in by means of a ring of "Vinamold." The crucible shaped cavity formed by removal of the crucible former was similarly filled with pure iridium powder (—200 BS mesh) and sealed in by means of a "Vinamold" plug.

The completed mould was then placed inside a high-pressure cylinder and water was admitted thereto over a period of 3 minutes until the pressure reached 25 tons/in.$^2$. This pressure was maintained for one minute and then the pressure allowed to fall to atmospheric pressure over a period of a further minute. After removal of the mould from the cylinder the green compact formed was extracted from the mould as hereinabove described with reference to the accompanying drawings. The green compact was sufficiently strong to withstand conversion by heat treatment into the desired crucible and the handling associated therewith.

The green compact was then placed in an electric furnace, the temperature of which was raised over a period of five hours to 1550° C., maintained at this temperature for three hours and finally allowed to fall slowly to room temperature over a period of a further eight hours. During the whole of the heating and cooling cycle, an atmosphere of hydrogen was maintained in the electric furnace. The cooled sintered product had an overall height of 2.5 inches, an external diameter at the top of 2.2 inches and an external diameter of 1.8 inches at the bottom, with a wall thickness of 0.06 inch and a base thickness of 0.080 inch.

What I claim is:

1. A method of forming an undistorted green compact from particulate material, comprising:
    (a) enclosing said particulate material to be compacted within a body of reversible gel material,
    (b) enclosing a guard ring of ductile, easily compacted metal in particulate form within said reversible gel body and surrounding said particulate material, said guard ring metal capable of being compacted to form a green compact which will withstand stresses exerted thereon by the reversible gel upon release of applied compacting pressure,
    (c) applying an isostatic pressure to said gel body to form a compact of said particulate material and said particulate metal,
    (d) releasing said pressure upon said gel body, whereby said compact of said particulate metal withstands release stress within said gel body and thereby prevents distortion of said compacted material, and
(e) recovering said material from said gel as an undistorted green compact.

2. A method according to claim 1, wherein said particulate material comprises a platinum group metal or alloy thereof, a refractory metal or alloy thereof, a refractory metal oxide or a ceramic material, in particulate form.

3. A method according to claim 2, wherein said particulate material comprises ruthenium, rhodium, iridium, tungsten or molybdenum.

4. A method according to claim 1, wherein said metal comprises copper, nickel or iron.

5. A method according to claim 1, wherein the reversible gel comprises a highly plasticised and gelled thermoplastic synthetic resin.

6. A method according to claim 5, wherein the reversible gel comprises highly plasticised and gelled polyvinyl chloride.

7. A method according to claim 1, wherein the guard ring comprises a cylinder.

References Cited
UNITED STATES PATENTS

| | | | |
|---|---|---|---|
| 2,648,125 | 8/1953 | McKenna et al. | 264—111 |
| 3,313,871 | 4/1967 | Vogel et al. | 264—111 |

ROBERT F. WHITE, Primary Examiner

J. R. HALL, Assistant Examiner

U.S. Cl. X.R

264—109